No. 773,520. PATENTED OCT. 25, 1904.
A. POHORZELECK.
MACHINE FOR MAKING BASKETS.
APPLICATION FILED FEB. 21, 1902.
NO MODEL. 4 SHEETS—SHEET 1.

FIG. 1ª.

Witnesses
George G. Schoenlank
Thomas Kirkpatrick

Inventor
Arno Pohorzeleck
by H. van Desenmeh
Attorney

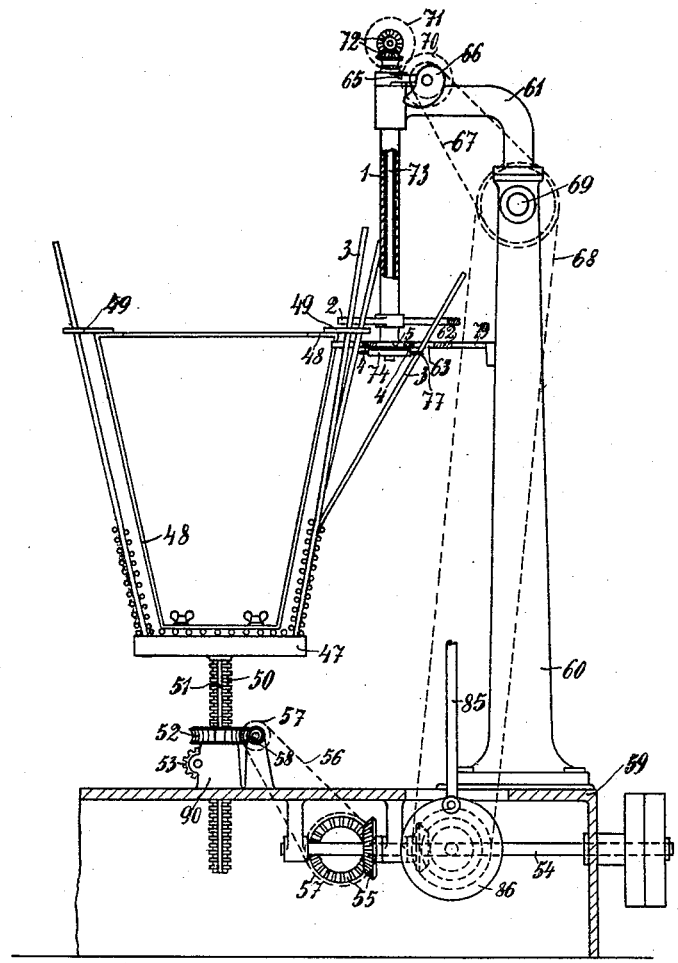

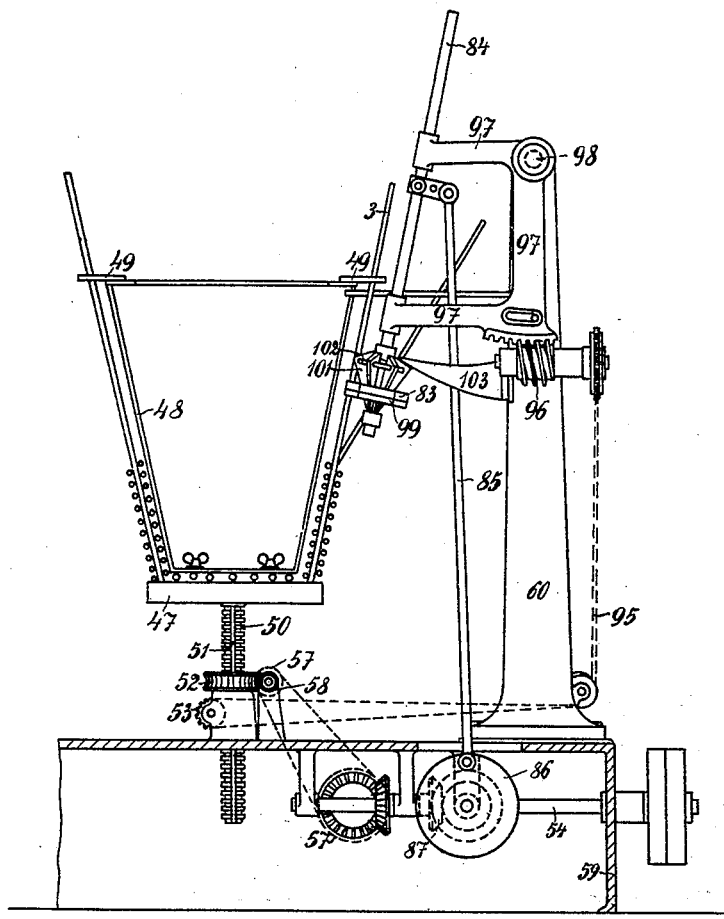

No. 773,520. PATENTED OCT. 25, 1904.
A. POHORZELECK.
MACHINE FOR MAKING BASKETS.
APPLICATION FILED FEB. 21, 1902.
NO MODEL. 4 SHEETS—SHEET 4.
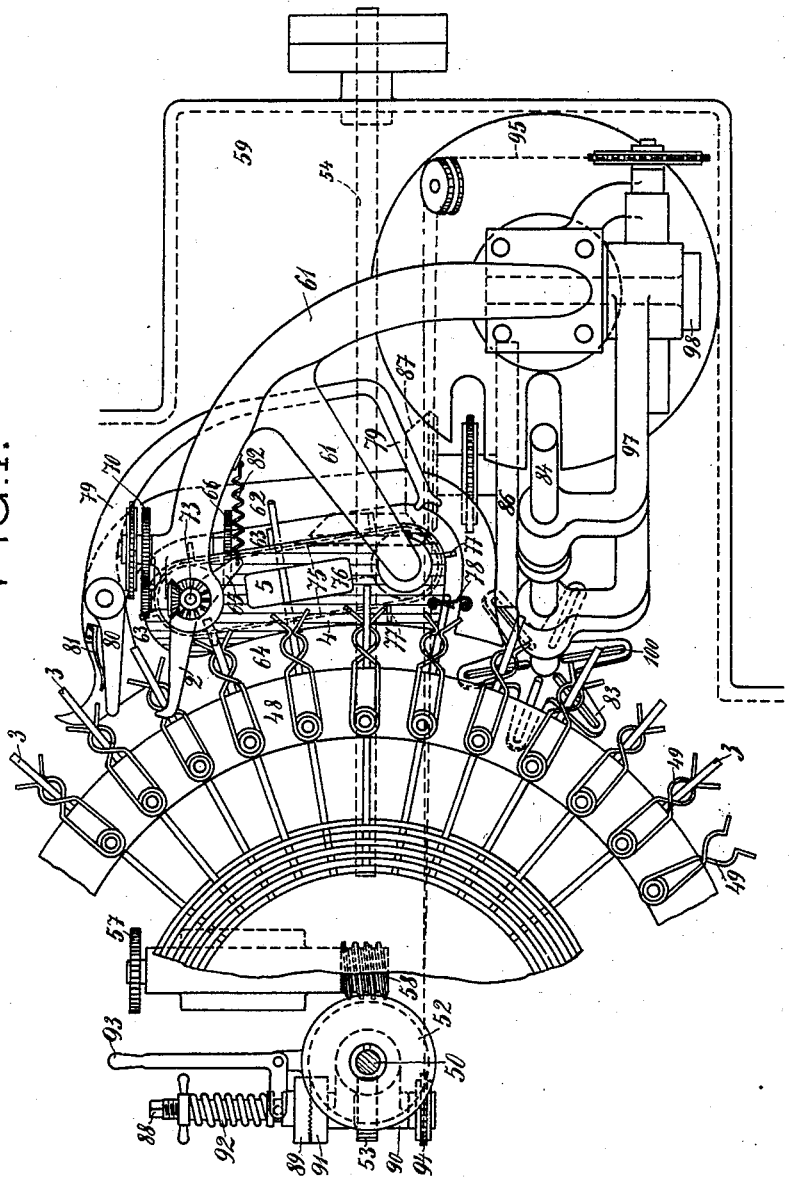

No. 773,520.

Patented October 25, 1904.

UNITED STATES PATENT OFFICE.

ARNO POHORZELECK, OF OSCHATZ, GERMANY.

MACHINE FOR MAKING BASKETS.

SPECIFICATION forming part of Letters Patent No. 773,520, dated October 25, 1904.

Application filed February 21, 1902. Serial No. 95,054. (No model.)

*To all whom it may concern:*

Be it known that I, ARNO POHORZELECK, a subject of the King of Saxony, residing at Oschatz, in the Kingdom of Saxony and Empire of Germany, have invented new and useful Improvements in Machines for Making Baskets, of which the following is a specification.

My invention relates to improvements in machines designed for making baskets.

The specification of Patent No. 757,344, of April 12, 1904, relative to a basket-making machine and process sets forth a mode of forming the shed which consists in holding the free ends of the stakes in rings, having a to and a fro movement imparted to them by cords to transfer the stakes alternately to one or the other side, so that every time the withes have been laid in the shed the stakes are moved in the opposite direction, fresh withes being then laid in the new shed formed. In the machine constructed according to my said invention the shed is formed by moving the stakes against a lever to which an oscillating movement is communicated. By this means the stakes are moved alternately in the one and the other direction, so that they occupy alternately different sides of a guide during the time the withes are laid in. In the continued advance of the stakes the shed is closed again behind the said guide. When the stakes strike the next time against the lever, they are caused to be bent in directions contrary to the preceding ones, thereby producing the wicker-work. The withes may be beaten home either while the shed is still open or after the same has been closed again. The operation of the oscillating lever may either be independent of the stakes, the movement of the lever being adapted to the speed at which the stakes advance, or the stakes themselves, or the elements which guide them serve to effect the movement of the lever in the opposite direction.

Figure 1:
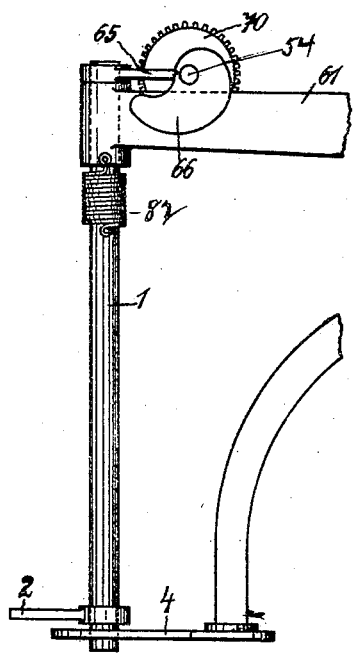
Figure 1:
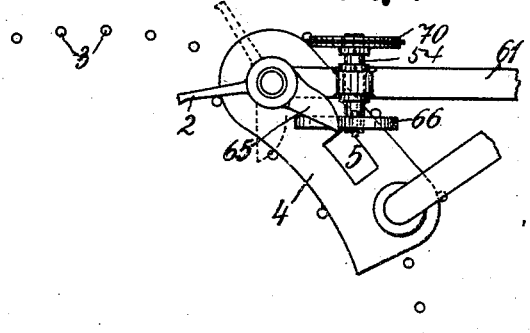
Figure 1:

In the accompanying drawings, Figure 1 is a side elevation of the oscillating lever, its operating mechanism and the stake-guide, the inner solid shaft and its operating device being removed from within the shaft of the oscillating lever. Fig. 1$^a$ is a plan view of the mechanism shown in Fig. 1. Fig. 2 is partly a side elevation and partly a vertical transverse section illustrating a constructional form of the machine, wherein the oscillating lever and the stake-guide shown in Fig. 1 are used. Fig. 3 shows the device for beating home the withes in the arrangement Fig. 2. Fig. 4 is a plan of the arrangement Fig. 2.

Similar numerals refer to like parts throughout the drawings.

The idea underlying the construction of the improved machine is illustrated in Fig. 1. With a tubular shaft 1 oscillates a lever 2, against which the stakes 3 are moved. The stakes are struck alternately from the outside and from the inside and bent out so that in their continued movement they may be held asunder by the guide 4. In the guide is an aperture 5, through which the withes are laid in the shed either by hand or automatically.

It is evident that if only one lever 2 is at work on the periphery of the basket there must be an odd number of stakes in order that every stake striking next upon the oscillating lever may be bent to the side opposite to that where the bending has previously taken place.

The mode of embodying the idea explained with the aid of Fig. 1 in the constructional form of my invention is illustrated by further figures. The basket-bottom, from which the stakes 3 proceed, is held upon a rotary table 47, (see Figs. 2 and 4,) a box-shaped attachment 48 being provided within the basket-skeleton and connected by screws with the table 47. At the upper edge of the attachment 48 are arranged tongs 49, by which the stakes 3 are held. The tongs 49 consist of spring-wire. One pair of them is shown open in Fig. 4.

The table 47 bears upon a round rack 50, having a longitudinal groove 51, with which engages a sliding key of the worm-wheel 52, so that the table 47 must take part in the turning movement of the worm-wheel 52. The rack 50 bears upon the toothed wheel 53, which is driven in a manner hereinafter to be described. The worm-wheel 52 is driven by the shaft 54 through the medium of the bevel-wheels 55 and the chain 56 passing over the sprocket-wheels 57. The upper sprocket-wheel 57 and the worm 58, gearing with the worm-wheel 52, are mounted upon the same shaft.

By the side of the table 47 is raised upon the said same bed-plate 59 the column 60, which carries on a forked arm 61 the device for actuating the oscillating lever 2 and the guide 4. At the same height as the guide 4 I arrange upon the column 60 a U-shaped bar 62 in such a manner that between the two a space 63 remains open through which several of the stakes are passed. A space 64 also remains between the guide 4 and the upper edge of the attachment 48. The stakes 3 are guided alternately through the spaces 63 and 64, thereby forming the shed, into which the withes are introduced through the aperture 5 in the guide. The alternate distribution of the stakes to the spaces 63 and 64 is performed by the oscillating lever 2. The hollow shaft 1, at the lower end of which the oscillating lever 2 is arranged, carries at its upper end the tappet 65, which is forced by the spring 82 against the cam-disk 66 and is actuated by the latter. The cam-disk 66 is set in rotation by the shaft 54 through the agency of chains 67 and 68 passing over suitably-arranged sprocket-wheels. The shaft 69, which effects the transmission between the chains 67 and 68, is omitted from Fig. 4.

The oscillating lever 2 is so operated that it will alternately deflect one stake into the space 63 and leave the next stake in the corresponding tongs 49 and thus also in the space 64.

In order that the stakes guided into the space 63 may be shifted by positive motion, I have devised the following arrangement: On the same shaft as the cam-disk 66 is mounted a toothed wheel 70, gearing with a second toothed wheel 71, which in its turn, through the intervention of a pair of bevel-wheels 72, moves the shaft 73 in the interior of shaft 1 of the oscillating lever. At the lower end of the shaft 73 is arranged a sprocket-wheel 74, driving the chain 75, which also passes over a second sprocket-wheel 76. Furnished on the chain 75 are tappets 77, extending into the space 63 and moving the stakes introduced into it by the oscillating lever 2 through the same until they arrive in front of a pair of clamping-springs 78, which do not permit the stakes to leave the space 63 till the tongs 49, pertaining to the corresponding stake, have arrived in front of the space. At this moment a lever-arm 79, whose free end is forked, overcoming the power of the springs 78, pushes the stake out of the space 63, and by furthermore overcoming the spring-power of the tongs 49, placed in front of the space 63, pushes the stake into these tongs. The movement of the lever 79 takes place by the oscillating lever 2 at the same time as it deflects another stake to the space 63, the free extremity of the oscillating lever 2 striking upon the tailpiece 80 of the lever-arm 79, held in its position of rest by the spring 81.

The withes are beaten home immediately after the stake has returned from the space 63 to the space 64. Use is made for this purpose of a star 83, which by its arms takes into the intervals between the stakes, engaging with these latter as with a toothed wheel, so that as the stakes advance the star will be turned. The star 83 is mounted at the lower end of a rod 84, adapted to be displaced in the axial direction and having an up-and-down movement imparted to it from the crank-disk 86 by means of the connecting-rod 85. The crank-disk 86 is rotated from the driving-shaft 54 through the agency of the bevel-wheels 87. By laying withes in the shed of stakes the wicker-work gradually increases in height, so that the table 47 can descend in proportion. As stated above, the table 47 bears by the round rack 50 upon the teeth of the toothed wheel 53. This wheel is fixed upon the shaft 88, with which through the intervention of a sliding key the half 89 of the coupling can be turned. To the half 89 of the coupling corresponds the half 91, fixed to the bracket 90, for supporting the worm-wheel 52 and against whose face the half 89 is forced by the spring 92. As soon as the blow of the star 83 upon the withes has reached a certain degree—the up-and-down movement of the star being determined by the pitch circle of the crank-disk 86, while the height of the wicker-work increases—the power of the spring 92, acting at the point of contact of the two halves 89 and 91, is overcome, and the half 89 will be rotated with respect to the stationary half 91, so that the toothed wheel 53 will also be turned, and the table 47 will descend. If the table 47 is to be raised again, the halves 89 and 91 are separated from each other by means of the lever 93, so that by means of a crank placed upon the square of the shaft 88 the toothed wheel 53 can be turned to lift the rack 50.

As the wicker-work progresses the diameter of the basket increases. Therefore the star 83 has to be removed from the geometric axis of the basket and of the table 47. This is accomplished by utilizing the rotation of the wheel 53 and of the shaft 88 for causing the shaft 84 of the star 83 to swing outward. For this purpose a sprocket-wheel 94, mounted upon the shaft 88, turns the worm 96 by means of the chain 95, the said worm gearing with the worm-wheel teeth on the frame 97, adapted to swing about the journal 98 on the column 60. At its free end the frame 97 supports the bearings for the shaft 84 of the star 83.

What I claim as my invention, and desire to secure by Letters Patent, is—

1. In a machine for making wicker-work, the combination with a traveling stake-carrier, of a relatively fixed oscillating lever to which the stakes are brought by said carrier, means for oscillating said lever, and a stake-guide in rear of the lever and to opposite sides of which the stakes are deflected, substantially as described.

2. In a machine for making baskets, the combination, with a stand and a table for clamping the stakes, of an oscillating lever and a stake-guide having an aperture for feeding the withes between two sets of stakes forming the shed, substantially as set forth.

3. In a machine for making baskets, the combination, with a stand and a table for clamping the stakes, of an oscillating lever, tongs for holding the stakes, a stake-guide placed by the side of the stakes leaving an interval which forms a path for one set of stakes held by the tongs, a U-shaped bar embracing the stake-guide so as to leave an interval which forms a path for the other set of stakes, the said oscillating lever being arranged at the entrances of the said paths, substantially as set forth.

4. In a machine for making baskets, the combination, with a stand and a table for clamping the stakes, of an oscillating lever, tongs for holding the stakes, a stake-guide placed by the side of the stakes, leaving an interval which forms a path for one set of stakes held by the tongs, a U-shaped bar embracing the stake-guide, so as to leave an interval which forms a path for the other set of stakes, the said oscillating lever being arranged at the entrances of the said paths, and a chain having projections extending into the said second path, substantially as set forth.

5. In a machine for making baskets, the combination, with a stand and a table for clamping the stakes, of an oscillating lever, tongs for holding the stakes, a stake-guide placed by the side of the stakes, leaving an interval which forms a path for one set of stakes held by the tongs, a U-shaped bar embracing the stake-guide so as to leave an interval which forms a path for the other set of stakes, the said oscillating lever being arranged at the entrances of the said paths, a chain having projections extending into the said second path, a lever having a forked end, and a spring, the said forked end and spring being arranged at the rear end of the said path, substantially as set forth.

6. In a machine for making baskets, the combination, with a stand and a table for clamping the stakes, of an oscillating lever, tongs for holding the stakes, a stake-guide placed by the side of the stakes leaving an interval which forms a path for one set of stakes held by the tongs, a U-shaped bar embracing the stake-guide so as to leave an interval which forms a path for the other set of stakes, the said oscillating lever being arranged at the entrances of the said paths, a stamp forming a star whose arms extend into the intervals between the stakes, an oscillating frame carrying the shaft of the said star and having worm-wheel teeth and a worm adapted to gear with said teeth, substantially as set forth.

7. In a machine for making baskets, the combination, with a stand and a table for clamping the stakes, of an oscillating lever, tongs for holding the stakes, a stake-guide, a U-shaped bar, a stamp in the form of a star whose arms extend into the intervals between the stakes, an oscillating frame having worm-wheel teeth, a worm adapted to gear with the said teeth, a sprocket-wheel mounted upon the shaft of the worm, a second sprocket-wheel connected by a chain with the first, a toothed wheel mounted upon the shaft of the second sprocket-wheel, and a round rack carried by the said toothed wheel and supporting the said table, substantially as set forth.

8. In a machine for making baskets, the combination, with a stand and a table for clamping the stakes, of an oscillating lever, tongs for holding the stakes, a stake-guide, a U-shaped bar, a star-shaped stamp, an oscillating frame having worm-teeth, a worm adapted to gear with said teeth, a sprocket-wheel mounted upon the shaft of the worm a second sprocket-wheel connected by a chain with the first, a toothed wheel mounted upon the shaft of the second sprocket-wheel, a round rack carried by the said toothed wheel and supporting the said table, a coupling one half of which is fixed to the machine-frame and the other half of which is adapted to be shifted on the shaft of the said toothed wheel engaging with the said rack, and a spring tending to force the two halves of the coupling together, substantially as set forth.

In testimony whereof I have signed my name to this specification in the presence of two subscribing witnesses.

ARNO POHORZELECK.

Witnesses:
   RUDOLPH FRICKE,
   B. H. WARNER, Jr.